US009913203B2

(12) United States Patent
Brock et al.

(10) Patent No.: US 9,913,203 B2
(45) Date of Patent: Mar. 6, 2018

(54) WIRELESS COMMUNICATION UNIT, ACCESS POINT AND METHOD FOR PROVIDING A PRESENCE SERVICE IN A WIRELESS COMMUNICATION SYSTEM

(71) Applicant: ip.access Limited, Cambridge (GB)

(72) Inventors: David Charles Brock, Cambridge (GB); James Harrow, Cambridge (GB); Christopher Edward John Kilgour, Cambridge (GB); Neil Philip Piercy, Royston (GB); Nicholas Dougall Johnson, Cambridge (GB); Alan George Whitehead, Macclesfield (GB)

(73) Assignee: ip.Access Limited, Cambridge (GB)

( * ) Notice: Subject to any disclaimer, the term of this patent is extended or adjusted under 35 U.S.C. 154(b) by 0 days.

(21) Appl. No.: 15/320,576

(22) PCT Filed: Jun. 18, 2015

(86) PCT No.: PCT/EP2015/063688
§ 371 (c)(1),
(2) Date: Dec. 20, 2016

(87) PCT Pub. No.: WO2015/197459
PCT Pub. Date: Dec. 30, 2015

(65) Prior Publication Data
US 2017/0142637 A1    May 18, 2017

(30) Foreign Application Priority Data
Jun. 27, 2014  (GB) .................................. 1411480.5

(51) Int. Cl.
*H04W 60/04*  (2009.01)
*H04W 48/04*  (2009.01)
(Continued)

(52) U.S. Cl.
CPC ............. *H04W 48/04* (2013.01); *H04W 8/02* (2013.01); *H04W 36/32* (2013.01); *H04W 60/02* (2013.01); *H04W 60/04* (2013.01)

(58) Field of Classification Search
CPC ....... H04W 4/02; H04W 4/023; H04W 36/32; H04W 48/20; H04W 76/027
See application file for complete search history.

(56) References Cited

U.S. PATENT DOCUMENTS

2011/0216732 A1*  9/2011  Maeda ..................... H04W 4/08
                                                   370/329
2015/0334636 A1* 11/2015  Maeda ..................... H04W 4/08
                                                   370/252

FOREIGN PATENT DOCUMENTS

GB    2502340 A1   11/2013
GB    2507119 A1    4/2014
(Continued)

OTHER PUBLICATIONS

3rd Generation Partnership Project; Technical Specification Group Core Network and Terminals; Mobile radio interface Layer 3 specification; Core network protocols; Stage 3 (Release 12), 3GPP Standard; 3GPP TS 24.008, 3rd Generation Partnership Project (3GPP), Mobile Competence Centre ; 650, Route Des Lucioles ; F-06921 Sophia-Antipolis Cedex ; France, vol. CT WG1, No. V12.6.0, Jun. 26, 2014 (Jun. 26, 2014), pp. 1-698, XP050774200.

*Primary Examiner* — Diane Mizrahi
(74) *Attorney, Agent, or Firm* — Optimus Patents US, LLC

(57) ABSTRACT

A presence service can be provided by an access point 101 serving a small cell 100 by rejecting a request for registration from a user equipment 103 after acquiring its IMSI and sending the IMSI to a presence database 105. The user equipment determines if the cell is a presence cell by comparing the cell's location area code (LAC) with LACs (Continued)

stored in a list and looking for a match. It the cell is a presence cell then the user equipment, rather than placing the LAC in a forbidden list, re-tries registration again but only after a pre-set time period of 5-10 minutes has elapsed. This has the advantage that a presence service can be notified of subscribers who linger in a particular area or return to that area at regular intervals.

15 Claims, 4 Drawing Sheets

(51) Int. Cl.
    *H04W 60/02*     (2009.01)
    *H04W 36/32*     (2009.01)
    *H04W 8/02*     (2009.01)

(56) References Cited

FOREIGN PATENT DOCUMENTS

GB     2507301 A1     4/2014
WO     2014/063913 A1     5/2014

* cited by examiner

WIRELESS COMMUNICATION UNIT, ACCESS POINT AND METHOD FOR PROVIDING A PRESENCE SERVICE IN A WIRELESS COMMUNICATION SYSTEM

FIELD OF THE INVENTION

The field of this invention relates to network elements, a wireless communication system and methods for operating a cellular communication system and has particular applicability to providing a location presence service in such a system.

BACKGROUND OF THE INVENTION

Wireless communication systems, such as the $3^{rd}$ Generation (3G) of mobile telephone standards and technology, are well known. An example of such 3G standards and technology is the Universal Mobile Telecommunications System (UMTS™), developed by the $3^{rd}$ Generation Partnership Project (3GPP™) (www.3gpp.org). The $3^{rd}$ generation of wireless communications has generally been developed to support macro-cell mobile phone communications. Such macro cells utilise high power base stations (NodeBs in 3GPP parlance) to communicate with wireless communication units within a relatively large geographical coverage area. Typically, wireless communication units, or User Equipment (UEs) as they are often referred to in 3G parlance, communicate with a Core Network (CN) of the 3G wireless communication system via a Radio Network Subsystem (RNS). A wireless communication system typically comprises a plurality of radio network subsystems, each radio network subsystem comprising one or more cells to which UEs may attach, and thereby connect to the network. Each macro-cellular RNS further comprises a controller, in a form of a Radio Network Controller (RNC), operably coupled to the one or more Node Bs, via a so-called Iub interface.

The second generation wireless communication system (2G), also known as GSM, is a well-established cellular, wireless communications technology whereby "base transceiver stations" (equivalent to the Node B's of the 3G system) and "mobile stations" (user equipment) can transmit and receive voice and packet data. Several base transceiver stations are controlled by a Base Station Controller (BSC), equivalent to the RNC of 3G systems.

Communications systems and networks are developing towards a broadband and mobile system. The 3rd Generation Partnership Project has proposed a Long Term Evolution (LTE) solution, namely, an Evolved Universal Mobile Telecommunication System Territorial Radio Access Network, (E-UTRAN), for a mobile access network, and a System Architecture Evolution (SAE) solution, namely, an Evolved Packet Core (EPC), for a mobile core network. An evolved packet system (EPS) network provides only packet switching (PS) domain data access so voice services are provided by a 2G or 3G Radio Access Network (RAN) and circuit switched (CS) domain network. User Equipment (UE) can access a CS domain core network through a 2G/3GRAN such as the (Enhanced Data Rate for GSM Evolution, EDGE) Radio Access Network (GERAN) or a Universal Mobile Telecommunication System Terrestrial Radio Access Network (UTRAN), and access the EPC through the E-UTRAN.

Some User Equipments have the capability to communicate with networks of differing radio access technologies. For example, a user equipment may be capable of operating within a UTRAN and within an E-UTRAN.

Lower power (and therefore smaller coverage area) cells are a recent development within the field of wireless cellular communication systems. Such small cells are effectively communication coverage areas supported by low power base stations. The terms "picocell" and "femtocell" are often used to mean a cell with a small coverage area, with the term femtocell being more commonly used with reference to residential small cells. Small cells are often deployed with minimum RF (radio frequency) planning and those operating in consumers' homes are often installed in an ad hoc fashion. The low power base stations which support small cells are referred to as Access Points (AP's) with the term Home Node B (HNB) or Evolved Home Node B (eHNB) defined by 3GPP to identify femtocell Access Points. Each small-cell is supported by a single Access Point. These small cells are intended to augment the wide area macro network and support communications to multiple User Equipment devices in a restricted, for example, indoor environment. Such small cells are intended to be able to be deployed "underneath" a macrocell (in a multi-layer structure, for example) in order to support communications to UEs in a restricted area such as a shopping mall, for example. An additional benefit of small cells is that they can offload traffic from the macro network, thereby freeing up valuable macro network resources). One or more Access Points are linked to a Core Network through an Access Controller. An Access Controller which links one or more HNB's to the Core Network is known as a Home Node B Gateway (HNB-GW). An HNB provides a radio access network connectivity to a user equipment (UE) using the so-called Iuh interface to a HNB-GW.

Typical applications for such Access Points include, by way of example, residential and commercial locations, communication 'hotspots', etc., whereby Access Points can be connected to a core network via, for example, the Internet using a broadband connection or the like. In this manner, small cells can be provided in a simple, scalable deployment in specific in-building locations where, for example, network congestion or poor coverage at the macro-cell level may be problematic.

Thus, an AP is a scalable, multi-channel, two-way communication device that may be provided within, say, residential and commercial (e.g. office) locations, 'hotspots' etc, to extend or improve upon network coverage within those locations. Although there are no standard criteria for the functional components of an AP, an example of a typical AP for use within a 3GPP 3G system may comprise Node-B functionality and some aspects of Radio Network Controller (RNC) functionality as specified in 3GPP TS 25.467.

Herein, the term "small cell" means any cell having a small coverage area and includes "picocells" and "femtocells."

Often in a small cell network, an Access Point Management System (AMS) is provided which may communicate with each Access Point and/or the Access Controller (HNB-GW). This management system is typically configured to manage a large number of Access Points, for example, monitoring, software upgrades, failure management and informing each Access Point of its assigned Location Area Code (or Routing Area Code). A Location Area Code (LAC) is a specific field in a Local Area Identifier which uniquely distinguishes one Location Area from others which are serviced by the same Mobile Switching Centre (MSC) of the Core Network. Some small cell systems employ a two-tiered LAC allocation scheme in order to maximise the number of supported small cells with distinct LAC's yet make the entire small cell system transparent to the core network (see for example US-A-20080207170).

When a User Equipment (UE) camps on to a particular HNB, for example, the HNB attempts to register the UE with the HNB-GW by sending a HNBAP UE register request message. The message can contain a UE identity and will be acknowledged with an accepted message if the registration is successful. The HNB broadcasts its assigned LAC which the UE detects and subsequently acknowledges that it is now operating in that Location Area by sending a "Location Update" message. The HNB may monitor the UE via the periodic location updates. If a number of location updates are missed, the HNB assumes that the UE is no longer camped on and has left the HNB's' area of coverage. The HNB then informs the HNB-GW of this occurrence by sending a HNBAP deregister message.

A current industry model is to implement a GSMA OneAPI on one of three places: viz. on the User Equipment (for handset applications) or on the small cell (for local applications) or on the application Gateway (for external third-party access). The GSMA OneAPI is an application programming interface which has been developed by the GSM (Global System for Mobile Communications) Association. It is intended to be a web service interface. An application developed with OneAPI can obtain information across network operators that support it. It is intended for operation on servers and mobile devices and the first API's to be implemented will be for messaging and location functions. Specifically, version 1 requires "location presence" capability and the ability to send and receive short message services (SMS) and multimedia messaging services (MMS) through the application Gateway using the GSMA OneAPI.

"Presence" services in general permit an individual and equipment which he/she uses for communication to share information on the state of the individual and that equipment. Such information can include whether the individual and his communication equipment are currently able to communicate with others or are engaged on a video call, for example. "Presence" can also include information relating to the location of a user's communication equipment. A "presence server" may be provided in such instances for, on detection that a particular UE has entered a particular location, enabling applications that subscribe to a "presence" service to take some form of action. For example, location information can be very useful to retailers and advertisers who may wish to communicate with shoppers who are known to be in a certain location at a certain time, a shopping mall for example.

Some current Location Presence services are based on the use of a localised Identity Request sent by an Access Point to a UE to obtain its IMSI International Mobile Subscriber Identifier). This was originally proposed to support a form of access control. If the Access Point is prepared to offer normal telecommunications services, then the UE is allowed to register on the small cell. Alternatively, the IMSI may be captured from the so-called "Common_ID" sent by the Core network. In each case an Access Point must have a different LAC/RAC from the surrounding coverage (ie. other small cells or overlapping macrocell) in order to prompt a Registration attempt when camping on. A registration attempt may be used to prompt a location presence trigger. (See Applicant's co-pending Application GB 1209224.3).

In summary, current Location Presence services provide detection of a permitted user camping on an Access Point (or HNB). At this point a Registration will also be sent to the Core Network. This covers the scenarios of open access cells where all users are accepted for service; and the permitted user group of a closed access HNB.

In some circumstances (e.g. for traffic capacity reasons), rather than permitting the UE to register and receive telecommunications services, it may be desirable for an AP to reject the UE so that it returns to the macro network. Two commonly-understood methods for achieving this are "LU (Location Update) Reject" (or, more generally, Registration Reject) or "Authentication Failure". The latter method is not generally preferred as behaviour varies across UEs and different 3GPP releases. A UE may also be rejected if it is not authorised to receive services from a particular Access Point ie. where there is Closed Access Control. Typically, the UE holds a "reject list" of LAC's from which it has been rejected. The capacity of this list is typically 10 LAC's. These stored LAC's are discarded on a cyclic first-in-first-out basis when the list reaches full capacity.

A further feature of the registration reject method, using the commonly-used cause code values, is that a rejected UE will delay trying to access an Access Point, having an LAC which is recorded in the reject list, for a lengthy period (typically 12-24 hours or the UE power-cycle). This is generally an advantage for Closed Access Control, but a disadvantage for a Location Presence service, as the UE will be prevented from re-accessing the same cell or from accessing another cell using the same LAC for a long period.

Herein, the term "presence cell" means a cell which is employed for the detection of wireless communication units which are in the area of coverage of the presence cell.

SUMMARY OF THE INVENTION

Aspects of the invention provide network elements, a wireless communication system and methods therefor as described in the appended claims.

According to a first aspect of invention there is provided a wireless communication unit arranged to: request registration with a cell having a designated area code; and on receiving, from said cell, a message rejecting the registration request, determine if the cell is a presence cell and if so, request registration again with a cell having the designated area code only after a pre-set time period has elapsed.

The wireless communication unit may include a first memory for storing an identifier of one or more presence cells. The identifier(s) may be hardcoded into the unit. Alternatively, the first memory may be located in a SIM (subscriber identity module) or USIM.

In one example, the wireless communication unit has a second memory for storing the preset time period. The second memory may be located in a SIM (subscriber identity module) or USIM.

In one embodiment, the wireless communication unit is arranged to receive a message from the cell which identifies the cell as a presence cell.

In another embodiment, the wireless communication unit is arranged to receive a message from the cell which includes the pre-set time period.

In a further example, the wireless communication unit is arranged to receive a message from the cell which includes a cause code.

Thus, small changes in standard messaging from a cell to a user equipment are made which result in a modification of the behaviour of the user equipment in relation to that particular cell.

Preferably, the preset time period is between five and ten minutes. So only a comparatively short period of time will elapse before a user equipment attempts to register with the presence cell again after being initially rejected. This has the advantage that a presence service can be notified of subscribers who linger in a particular area or return to that area at regular intervals. In contrast, in known systems, the location area code of the presence cell would be entered into the user equipment's forbidden list and no further attempt would be made to register (at least for 12-24 hours or after switching the user equipment off and then on again). A finite pre-set time period prevents the user equipment from continually "ping-ponging" between the presence cell and an overlapping macrocell which has a location area code different from that of the presence cell. The ability to configure the pre-set time period by SIM/USIM configuration or message allows the maximum update rate to be tuned to the particular needs of the presence application. The knowledge that a cell is of presence cell type can also be used to modify the reselection algorithm used by a wireless communication unit to determine whether it should attempt to access the presence cell, for example, preferentially accessing the cell, even though it may not be the best available, in order to improve the reliability of presence detection.

According to a second aspect of the invention, there is provided an access point for serving a presence cell which has a designated area code, wherein the access point is arranged to; transmit an identification message for reception by a wireless communication unit identifying the cell that it serves as a presence cell, receive a request for registration from a wireless communication unit, receive from the wireless communication unit an identity of the wireless communication unit, generate a presence notification signal which includes an identity of the wireless communication unit, and transmit a reject message for reception by the wireless communication unit rejecting the request for registration.

In one embodiment, an identity of the wireless communication unit is its temporary mobile subscriber identity (TMSI). In another embodiment, an identity of the wireless communication unit is its international mobile subscriber identity (IMSI) and the access point transmits a request message for reception by the wireless communication unit requesting the IMSI of the of the wireless communication unit.

In one embodiment, the access point is arranged to transmit, for reception by a wireless communication unit, a message which includes a pre-set time period.

In another embodiment, the access point is arranged to transmit, for reception by a wireless communication unit, a message which includes a cause code.

According to a third aspect of the invention there is provided a method for providing a presence service in a wireless communication system, the method including; at an access point serving a presence cell which has a designated area code, receiving a request for registration from a wireless communication unit, receiving from the wireless communication unit an identity of the wireless communication unit, generating a presence notification signal which includes an identity of the wireless communication unit, transmitting a reject message for reception by the wireless communication unit rejecting the request for registration; and at the wireless communication unit, requesting registration with the access point, transmitting an identity of the wireless communication unit for reception by the access point, receiving the message rejecting the request for registration, determining if the cell is a presence cell and if so, requesting registration again with a cell having the designated area code only after a pre-set time period has elapsed.

An identity of the wireless communication unit may be its international mobile subscriber identity (IMSI) or a temporary mobile subscriber identity (TMSI).

In one embodiment, the access point transmits a message for reception by the wireless communication unit identifying the cell that it serves as a presence cell.

In one embodiment, the access point transmits a message for reception by the wireless communication unit which includes the pre-set time period.

In one embodiment, the access point transmits a message for reception by the wireless communication unit which includes a cause code. A cause code may be generated by the access point itself or may originate from a core network element, such as a Mobile Switching Centre, for example, which is the usual source of registration cause codes. In one example, the cause code rejects the wireless communication unit for a pre-set time period, In one embodiment, the designated area code is different from an area code assigned to a macrocell which overlaps a covered area of the presence cell. The designated area code may be a location area code (LAC).

In one embodiment, the wireless communication unit attempts to register with the access point using a Location Area Update request. The access point responds by sending to the wireless communication unit a Location Update Reject message.

These and other aspects, features and advantages of the invention will be apparent from, and elucidated with reference to, the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION

The inventive concept finds particular applicability in a cellular communication system that supports a number of overlapping communication coverage areas, for example a communication system that comprises a combination of small cells and macro cells. Further, the inventive concept is not limited to one particular radio access technology. For example, the invention can be implemented in 2G or 3G networks, for example.

Those skilled in the art will recognize and appreciate that the specifics of the examples described are merely illustrative of some embodiments and that the teachings set forth herein are applicable in a variety of alternative settings. For example, since the inventive concepts do not depend on any particular combination of radio access technologies, it is envisaged that the inventive concepts can be applied to other combinations of RAT's although 3G systems are shown in the embodiments. As such, other alternative implementations within cellular communication systems conforming to different standards are contemplated and are within the scope of the various teachings described.

Figure 1:
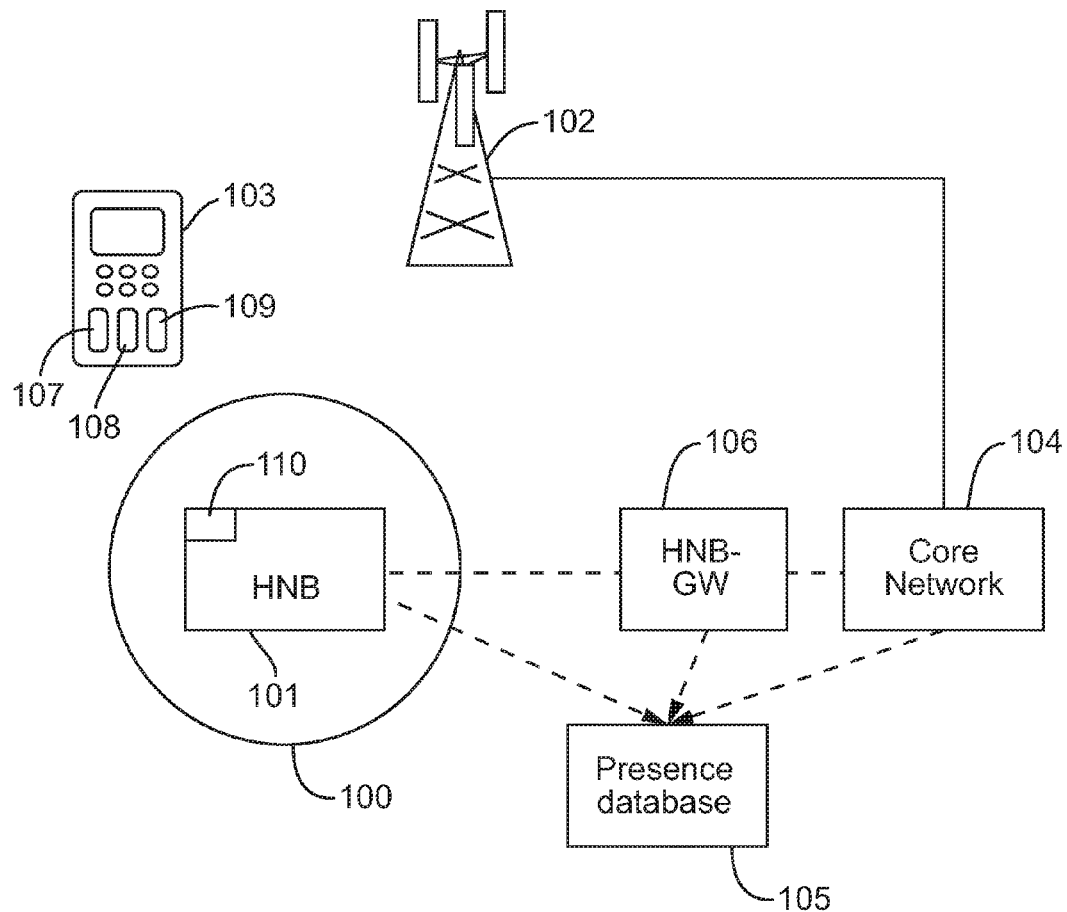
FIG. 1 is a simplified schematic block diagram of apparatus for providing a location presence service in accordance with an embodiment of the invention.

Referring now to FIG. 1, a presence cell 100 is served by an Access Point which, in this example, comprises a Home Node B' 101. The presence cell 100 has a coverage area which lies within a coverage area of a macrocell which is served by a base station 102. The macrocell supports communications between a user equipment 103 and a core network 104 via other network elements (not shown). The macrocell has a location area code and the presence cell has a designated location area code which is different from the macrocell's location area code. The Home Node B 101 is connected to a presence database. 105.

In one embodiment, the presence cell 100 is connected to the core network 104 through a Home Node B Gateway 106. This allows the core network to receive and process user equipment registration requests, accept the requests or reject them using cause codes of its choice, including codes associated with presence detection. In addition to facilitating presence detection this allows the core network to selectively offer communications service to user equipments via the presence cell 100.

In another embodiment, there is no connection between the Home Node B 101 and the core network 104. The presence cell is solely used for presence detection, with no communications service offered.

The user equipment 103 has a first memory 107 for storing a list of location area codes of presence cells, for example the presence cell 100. The user equipment 103 also has a second memory 108 for storing a value of a preset time interval. The user equipment 103 has a processor 109 whose function will be described below.

The Home Node B 101 has a message generator 110 for generating messages to be transmitted by the Home Node B for reception by the user equipment.

Figure 2:
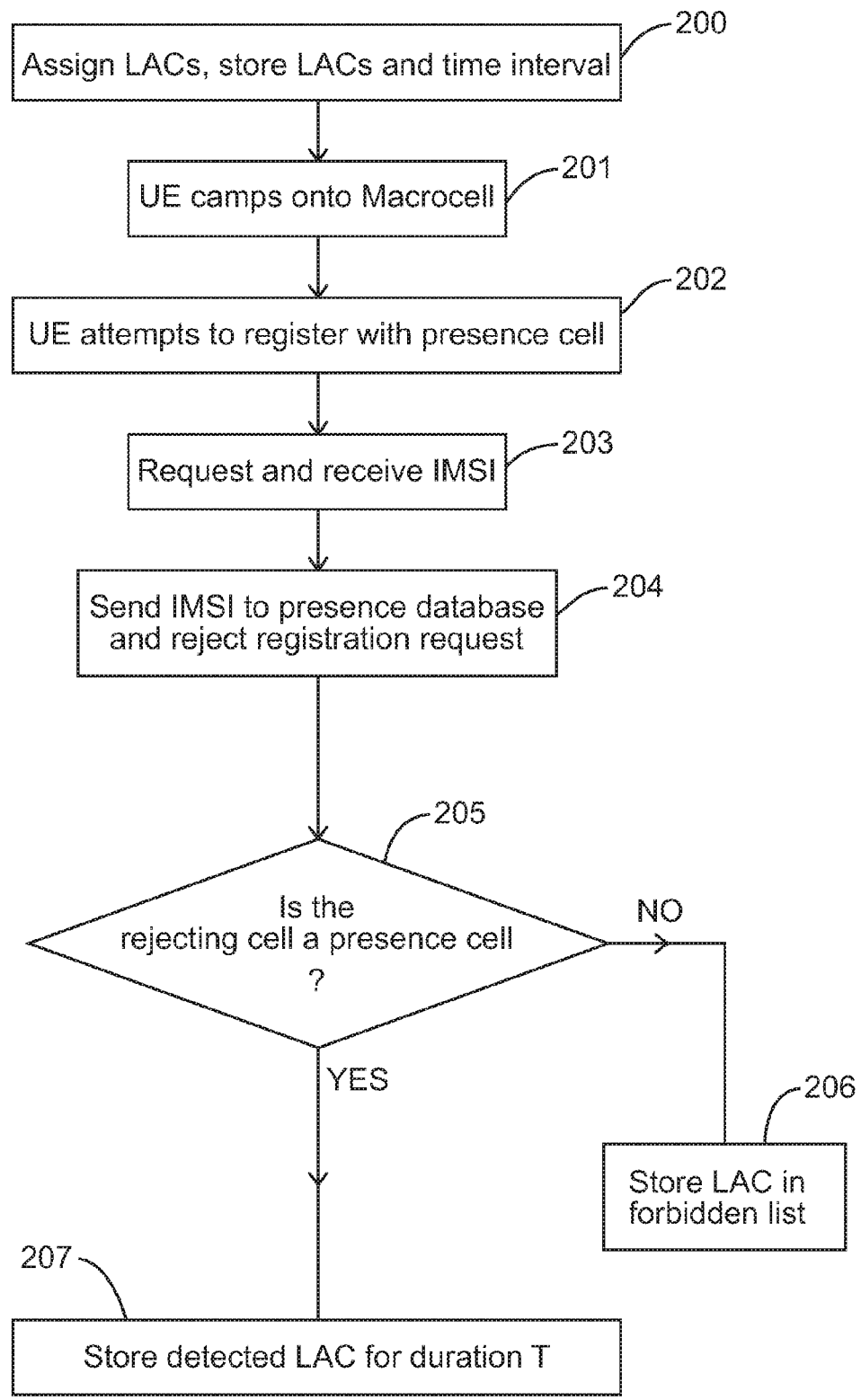
FIG. 2 is a simplified flow chart of a first method for providing a location presence service according to an embodiment of the invention.

An example of operation of a presence service in accordance with embodiments of the invention will now be described with reference to FIG. 2.

At 200 a designated LAC is assigned to the presence cell 100 and it is ensured that this LAC is different from the LACs of other neighbouring presence cells and neighbouring macrocells. In some embodiments, a range of LACs may be reserved for use by presence cells. The first memory 107 in the UE 103 is preconfigured with the LACs which have been assigned to presence cells. The second memory in the user equipment 103 has stored therein the value of a preset time period, T.

The user equipment (UE) 103 is initially outside the area of coverage of the presence cell 100 but within the coverage area of the macrocell. At 201, the user equipment "camps on" to the macrocell using standard techniques.

The user equipment now moves within the coverage area of the presence cell 100 and detects that this cell has a different LAC from the cell that it is already camped on to. In accordance with standard procedures, this difference in LACs prompts the UE to attempt registration with the presence cell by performing a Location Update. At 202, the user equipment transmits a Registration Request in the form of a Location Area Update request which is received by the Home Node B.

At 203, on receiving the Registration Request, the Home Node B responds, in accordance with known procedures, by sending an Identity Request to the user equipment. The user equipment responds by sending its IMSI. Hence, the Home Node B now knows the the IMSI of the user equipment and at 204 sends these identifiers to the presence database which logs this information. The Home Node B also sends a Location Update Reject message to the UE and the UE runs its standard cell re-selection measurement procedures in order to select another cell. This is likely to result in the UE camping back onto the macrocell. Also in accordance with standard procedures, the Home Node B 101 can be arranged to transmit parameters of neighbouring cells (including the macrocell) in order to assist the UE in selecting the best neighbouring cell to re-select. These parameters can be preconfigured in the Home Node B or can be self-configured using a network listen device.

At 205, the processor 109 in the UE 103 determines if the cell which has just rejected its registration request is a presence cell. It does this by determining if the LAC of the rejecting cell matches any one of the LAC's stored in the first memory. If this is not the case then at 206, the LAC of the rejecting cell is stored in a "forbidden list" in the user equipment. In the current 3GPP specifications, a typical user equipment may have several "forbidden lists." An appropriate one which could be used to store the LAC of the rejecting cell may be the "forbidden location areas for roaming" list. If, on the other hand, the LAC of the rejecting cell does match any one of the LAC's stored in the first memory, then at 207, the LAC is entered onto a list of detected presence LACs by the UE for a duration of T so that when the user equipment detects the presence cell 100 again, it will not retry registration before a time period, T, equal to the value stored in the second memory 108, has expired. Either the first or second memory can be used for storing the list of detected presence LAC's.

Figure 3:
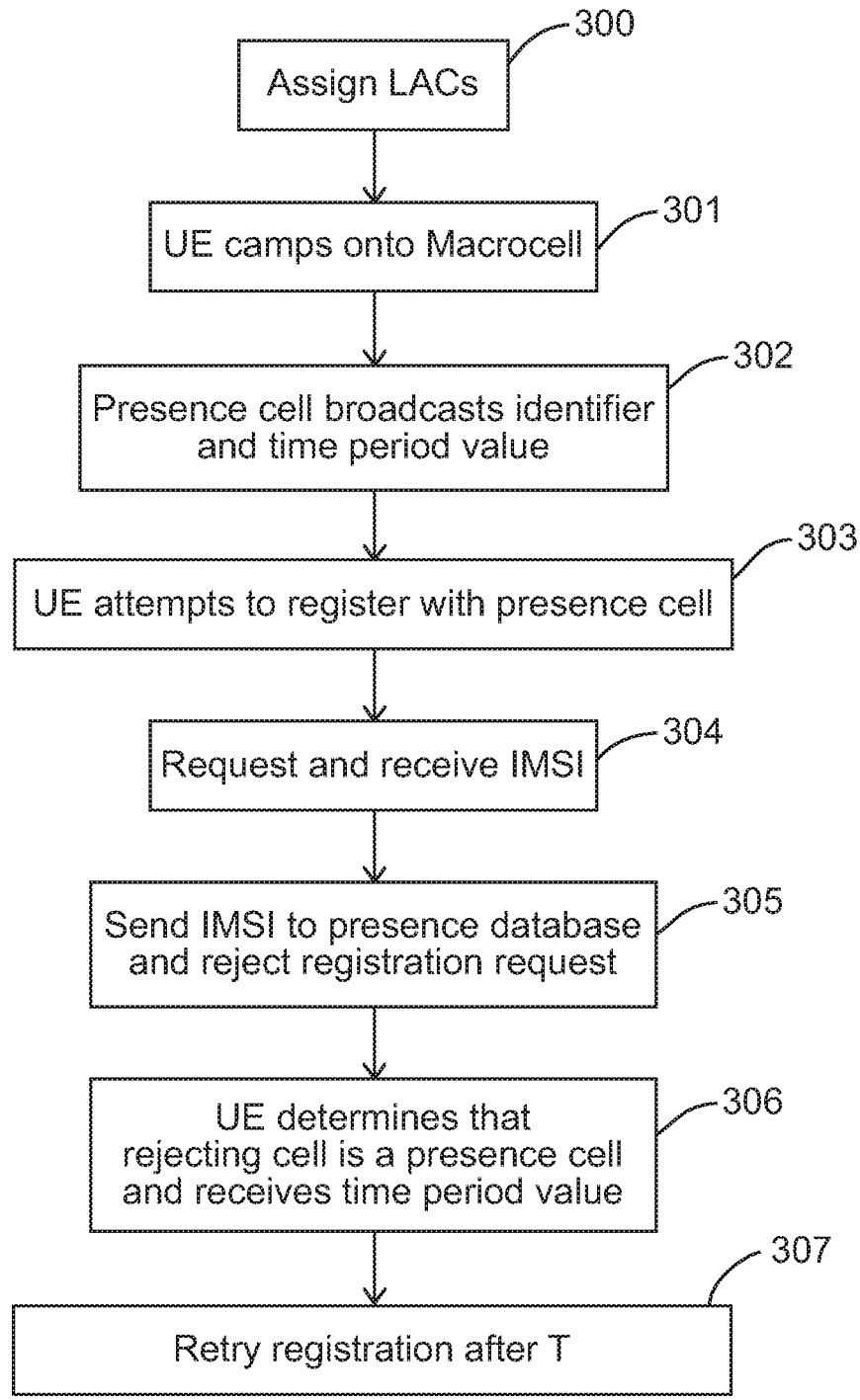
FIG. 3 is a simplified flow chart of a second method for providing a location presence service according to an embodiment of the invention.

A second example of operation of a presence service in accordance with embodiments of the invention will now be described with reference to FIG. 3.

At 300 a designated LAC is assigned to the presence cell 100 and it is ensured that this LAC is different from the LACs of other neighbouring presence cells and neighbouring macrocells. In some embodiments, a range of LACs may be reserved for use by presence cells.

The user equipment (UE) 103 is initially outside the area of coverage of the presence cell 100 but within the coverage area of the macrocell. At 301, the user equipment "camps on" to the macrocell using standard techniques.

At 302, the message generator 110 in the Home Node B 101 generates a first, "presence cell identifier" message which the Home Node B broadcasts for reception by the user equipment. The first message identifies the cell 100 that the Home Node B serves as a presence cell. The message generator 110 in the Home Node B 101 also generates a second, "time period" message which the Home Node B broadcasts for reception by the user equipment. The second message includes the value of a preset time period, T.

The user equipment now moves within the coverage area of the presence cell 100 and detects that this cell has a different LAC from the cell that it is already camped on to. The user equipment can also identify from the presence cell identifier message that the cell is of presence cell type and may modify the reselection algorithm used to determine whether it should attempt to access the cell, for example preferentially accessing a presence cell to improve the reliability of presence detection. In accordance with standard procedures, this difference in LACs prompts the UE to attempt registration with the presence cell by performing a Location Update. At 303, the user equipment transmits a Registration Request in the form of a Location Area Update request which is received by the Home Node B.

At 304, on receiving the Registration Request, the Home Node B responds, in accordance with known procedures, by sending an Identity Request to the user equipment. The user equipment responds by sending its IMSI. Hence, the Home Node B now knows the IMSI of the user equipment and at 305 sends these identifiers to the presence database which logs this information. The Home Node B also sends a Location Update Reject message to the UE and the UE runs its standard cell re-selection measurement procedures in order to select another cell. This is likely to result in the UE camping back onto the macrocell. Also in accordance with standard procedures, the Home Node B 101 can be arranged to transmit parameters of neighbouring cells (including the macrocell) in order to assist the UE in selecting the best neighbouring cell to re-select. These parameters can be preconfigured in the Home Node B or can be self-configured using a network listen device.

At 306, the processor 109 in the UE 103 determines if the cell which has just rejected its registration request is a presence cell by processing the received "presence cell identifier" message which is broadcast by the Home Node B. The processor also receives the second message broadcast by the Home Node B which includes the time period value.

At 307, when the user equipment detects the presence cell 100 again, it will retry registration but not before a time period equal to the time period value, T received by the processor 109 has expired.

In an alternative example of operation, the time period value is not broadcast by the Home Node B but stored in a memory in the user equipment instead.

Figure 4:
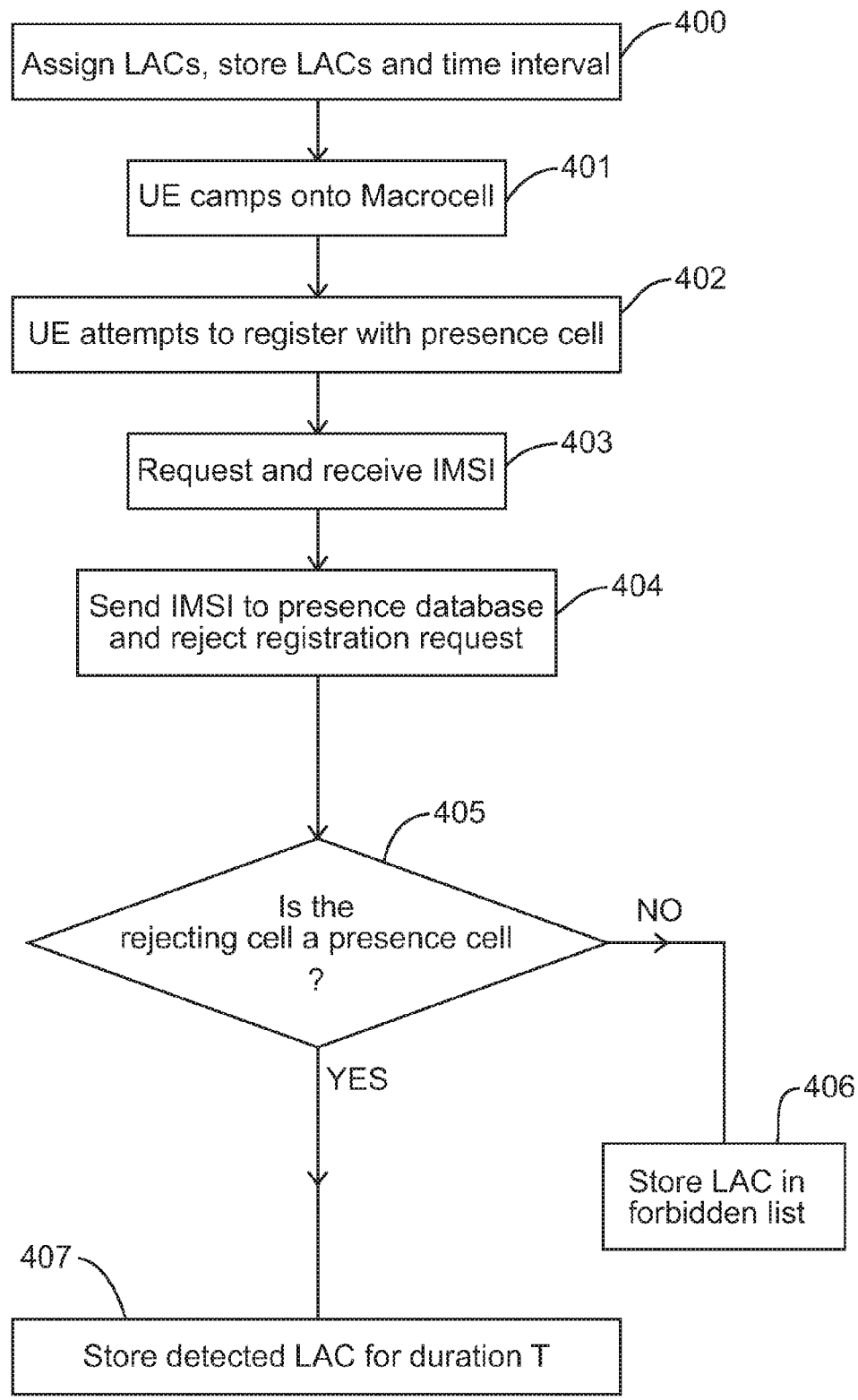
FIG. 4 is a simplified flow chart of a third method for providing a location presence service according to an embodiment of the invention.

In a third example of operation of a presence service in accordance with embodiments of the invention will now be described with reference to FIG. 4.

At 400 a designated LAC is assigned to the presence cell 100 and it is ensured that this LAC is different from the LACs of other neighbouring presence cells and neighbouring macrocells. In some embodiments, a range of LACs may be reserved for use by presence cells. The second memory 108 in the user equipment 103 has stored therein the value of a preset time period.

The user equipment (UE) 103 is initially outside the area of coverage of the presence cell 100 but within the coverage area of the macrocell.

At 401, the user equipment "camps on" to the macrocell using standard techniques.

The user equipment now moves within the coverage area of the presence cell 100 and detects that this cell has a different LAC from the cell that it is already camped on to. In accordance with standard procedures, this difference in LACs prompts the UE to attempt registration with the presence cell by performing a Location Update.

At 402, the user equipment transmits a Registration Request in the form of a Location Area Update request which is received by the Home Node B.

At 403, on receiving the Registration Request, the Home Node B responds, in accordance with known procedures, by sending an Identity Request to the user equipment. The user equipment responds by sending its IMSI. Hence, the Home Node B now knows the IMSI of the user equipment and at 404 sends these identifiers to the presence database which logs this information. The Home Node B also sends a Location Update Reject message including a cause code to the UE and the UE runs its standard cell re-selection measurement procedures in order to select another cell. This is likely to result in the UE camping back onto the macrocell. Also in accordance with standard procedures, the Home Node B 101 can be arranged to transmit parameters of neighbouring cells (including the macrocell) in order to assist the UE in selecting the best neighbouring cell to re-select. These parameters can be preconfigured in the Home Node B or can be self-configured using a network listen device.

At 405, the processor 109 in the UE 103 determines if the cell which has just rejected its registration request is a presence cell. It does this by analysis of the cause code value in the registration reject message, determining if the cause code value represents a rejection from a presence cell. If this is not the case then at 406, the LAC of the rejecting cell is stored in one of the existing "forbidden" lists in the user equipment (for example "forbidden location areas for roaming" in the current 3GPP specifications). If this is the case however, then at 407, the LAC is stored on a list of detected presence LACs, so that when the user equipment detects the presence cell 100 again, it will not retry registration before a time period, T, equal to the value stored in the second memory 108, has expired.

In alternative embodiments, instead of the IMSI of the user equipment being used as its identifier, its TMSI may be used instead. In such cases, the Identity request need not be sent by the presence cell as the TMSI is available from the initial registration request messages sent by the user equipment. The presence cell relies on the core network operator to perform a translation from TMSI to IMSI.

The signal processing functionality of the embodiments of the invention, particularly those functions performed by the Home Node B 101 may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' 'non-transitory computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

We claim:

1. A wireless communication unit configured to request registration with a cell having a designated area code; and on receiving, from said cell, a message rejecting the registration request, determine if the cell is a presence cell and if so, request registration again with a cell having the designated area code only after a pre-set time period associated with cells of type presence cell has elapsed.

2. The wireless communication unit of claim 1 including a first memory for storing an identifier of one or more presence cells.

3. The wireless communication unit of claim 2 wherein the first memory is included in a subscriber identity module, SIM, or universal mobile telecommunication system, USIM.

4. The wireless communication unit of claim 1 including a second memory for storing the pre-set time period.

5. The wireless communication unit of claim 4 wherein the second memory is included in a subscriber identity module, SIM, or universal subscriber identity module, USIM.

6. An access point for serving a presence cell that has a designated area code, wherein the access point is arranged to transmit an identification message for reception by a wireless communication unit identifying the cell that the access point serves as a presence cell, receive a request for registration from a wireless communication unit, receive from the wireless communication unit an identity of the wireless communication unit, generate a presence notification signal which includes an identity of the wireless communication unit, and transmit a reject message for reception by the wireless communication unit rejecting the request for registration.

7. The access point of claim 6 wherein the access point is arranged to transmit a request message, for reception by the wireless communication unit, requesting an identity of the wireless communication unit.

8. The access point of claim 6 wherein the access point is arranged to transmit, for reception by a wireless communication unit, a message that includes at least one of: a preset time period, a cause code.

9. A method for providing a presence service in a wireless communications system, the method comprising; at an access point serving a presence cell that has a designated area code:
   receiving a request for registration from a wireless communication unit that includes an identity of the wireless communication unit;
   generating a presence notification signal that includes an identity of the wireless communication unit; and transmitting a reject message for reception by the wireless communication unit rejecting the request for registration;
and at the wireless communication unit:
   requesting registration with the access point, transmitting an identity of the wireless communication unit for reception by the access point;
   receiving the message rejecting the request for registration;
   determining whether the cell is a presence cell and if so, requesting registration again with a cell having the designated area code only after a pre-set time period has expired.

10. The method of claim 9 further comprising transmitting a request message for reception by the wireless communication unit requesting an identity of the wireless communication unit.

11. The method of claim 10 wherein the identity of the wireless communication unit is one from a group of: an International Mobile Subscriber Identifier, IMSI, a Temporary Mobile Subscriber Identifier, TMSI.

12. The method of claim 9 wherein the access point transmits a message for reception by the wireless communication unit identifying the cell that serves as a presence cell.

13. The method of claim 9 wherein upon recognising that a cell is of presence cell type, in the wireless communication unit, modifying a reselection algorithm used to determine whether the wireless communication unit should preferentially attempt to access the so-recognised cell.

14. The method of claim 9 wherein the access point transmits a message for reception by the wireless communication unit which includes at least one of: a pre-set time period, a cause code.

15. The method of claim 9 wherein the request message transmitted by the wireless communication unit comprises a Location Area Update request and the reject message transmitted by the access point is a Location Update Reject message.

* * * * *